(12) United States Patent
Iyer et al.

(10) Patent No.: US 8,268,067 B2
(45) Date of Patent: Sep. 18, 2012

(54) PERFLUOROPOLYETHER COATING COMPOSITION FOR HARD SURFACES

(75) Inventors: Suresh Iyer, Woodbury, MN (US); Wayne W. Fan, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 380 days.

(21) Appl. No.: 12/574,182

(22) Filed: Oct. 6, 2009

(65) Prior Publication Data

US 2011/0081496 A1 Apr. 7, 2011

(51) Int. Cl.
*C08K 3/00* (2006.01)

(52) U.S. Cl. ............. 106/287.11; 106/287.16; 428/447; 427/387; 524/858; 524/869

(58) Field of Classification Search ............. 106/287.11, 106/287.16; 524/858, 869; 428/447; 427/387
See application file for complete search history.

(56) References Cited

U.S. PATENT DOCUMENTS

| | | | |
|---|---|---|---|
| 3,250,808 A | 5/1966 | Moore et al. | |
| 3,433,780 A | 3/1969 | Cekada et al. | |
| 3,646,085 A | 2/1972 | Bartlett | |
| 3,810,874 A | 5/1974 | Mitsch et al. | |
| 3,950,588 A | 4/1976 | McDougal | |
| 3,976,497 A * | 8/1976 | Clark | 106/287.16 |
| 3,986,997 A | 10/1976 | Clark | |
| 4,624,870 A | 11/1986 | Anthony | |
| 5,274,159 A | 12/1993 | Pellerite et al. | |
| 5,306,758 A | 4/1994 | Pellerite et al. | |
| 5,411,807 A | 5/1995 | Patel et al. | |
| 5,514,741 A * | 5/1996 | Arai et al. | 524/437 |
| 6,200,884 B1 | 3/2001 | Yang et al. | |
| 6,361,870 B1 | 3/2002 | Steffl et al. | |
| 6,689,839 B1 | 2/2004 | Hayakawa et al. | |
| 6,852,368 B2 * | 2/2005 | Takaguchi et al. | 427/387 |
| 6,852,417 B2 | 2/2005 | Fuller | |
| 6,861,149 B2 * | 3/2005 | Pellerite et al. | 428/428 |
| 6,923,921 B2 | 8/2005 | Flynn et al. | |
| 7,034,076 B2 | 4/2006 | Torii et al. | |
| 7,482,062 B2 * | 1/2009 | Higuchi et al. | 428/447 |
| 8,092,913 B2 * | 1/2012 | Rohaut et al. | 428/429 |
| 2004/0014718 A1 | 1/2004 | Pai et al. | |
| 2004/0092675 A1 | 5/2004 | Moore et al. | |
| 2004/0186216 A1 * | 9/2004 | Satoh et al. | 524/502 |
| 2005/0048288 A1 | 3/2005 | Flynn et al. | |
| 2005/0054804 A1 | 3/2005 | Dams et al. | |
| 2005/0121644 A1 | 6/2005 | Dams et al. | |
| 2005/0164010 A1 | 7/2005 | Trombetta | |
| 2005/0233070 A1 | 10/2005 | Pellerite et al. | |
| 2008/0220264 A1 | 9/2008 | Iyer et al. | |
| 2009/0263668 A1 | 10/2009 | David et al. | |

FOREIGN PATENT DOCUMENTS

| | | |
|---|---|---|
| DE | 10004132 | 8/2001 |
| EP | 0 200 086 | 7/1990 |
| EP | 0 416 887 | 3/1991 |
| EP | 0 797 111 | 9/1997 |
| JP | 61119666 | 6/1986 |
| JP | 4052268 | 12/2007 |
| WO | WO 99/37720 | 7/1999 |
| WO | WO 02/30848 | 4/2002 |
| WO | 2008/073689 * | 6/2008 |
| WO | 2008/076639 * | 6/2008 |
| WO | 2009/014798 * | 1/2009 |
| WO | WO 2009/045993 | 4/2009 |

OTHER PUBLICATIONS

PCT International Search Report, PCT/US2010/050804.
U.S. Appl. No. 61/247,641 entitled, "Method of Making Coated Metal Articles", filed Oct. 1, 2009.
U.S. Appl. No. 12/623,500 entitled, "Easy-to-Clean Article with Stainless Steel Surface and Method of Making the Same" filed Nov. 23, 2009.

* cited by examiner

*Primary Examiner* — Margaret Moore
(74) *Attorney, Agent, or Firm* — Kent S. Kokko

(57) ABSTRACT

A composition and method of treating substrates, in particular substrates having a hard surface such as ceramics, metal or glass, to render them water, oil, stain, and dirt repellent is described.

17 Claims, No Drawings

PERFLUOROPOLYETHER COATING COMPOSITION FOR HARD SURFACES

FIELD OF THE INVENTION

The present invention relates to a composition and method of treating substrates, in particular substrates having a hard surface such as ceramics, metal or glass, to render them water, oil, stain, and dirt repellent.

BACKGROUND OF THE INVENTION

The use of fluorinated silanes, i.e., silane compounds that have one or more fluorinated groups for rendering substrates such as glass and ceramics oil and water repellent are known. For example U.S. Pat. No. 5,274,159 describes destructible fluorinated alkoxy silane surfactants that can be applied from an aqueous solution. WO 02/30848 describes compositions comprising fluorinated polyether silanes for rendering ceramics oil and water repellent.

EP 797111 discloses compositions of alkoxysilane compounds containing perfluoropolyether groups to form antifouling layers on optical components. Additionally, U.S. Pat. No. 6,200,884 discloses compositions of perfluoropolyether-modified aminosilanes that cure into films having improved water and oil repellency and anti-stain properties.

U.S. Pat. No. 3,646,085 teaches fluorinated polyether silanes for rendering glass or metal surfaces oil and water repellent. WO 99/37720 discloses fluorinated polyether silanes for providing antisoiling coating to antireflective surfaces on substrates such as glass or plastic. U.S. Pat. No. 3,950,588 discloses the use of fluorinated polyether silanes to render ceramic surfaces such as bathroom tiles or cookware water and/or oil repellent.

SUMMARY

The present disclosure provides a coating composition for hard surfaces comprising a silsesquioxane hardcoat resin component, and a perfluoropolyether silane of the formula:

(I), wherein:

$R_f$ is a monovalent or divalent perfluoropolyether group;
$R_1$ is a divalent alkylene group, arylene group, or combinations thereof, optionally containing one or more heteroatoms or functional groups and optionally substituted with halides, and preferably containing about 2 to about 16 carbon atoms;
$R_2$ is a lower alkyl group, e.g. a $C_1$-$C_4$ alkyl group,
Y is a hydrolysable group; and
x is 0 or 1; and y is 1 or 2.

Although many fluorinated silane compositions are known in the art for treating substrates to render them oil and water repellent, there continues to be a desire to provide further improved compositions for the treatment of substrates, in particular substrates having a hard surface such as ceramics, glass and stone, in order to render them water and oil repellent and easy to clean. There is also a need for treating glass and plastic as a hard surface, particularly in the ophthalmic field, in order to render them stain, dirt and dust resistant.

The present disclosure is direct to a coating composition for hard surfaces comprising a silsequioxane hardcoat resin component and a perfluoropolyether silane component. Desirably, such compositions and methods employing them can yield coatings that have improved properties. In particular, it would be desirable to improve the durability of the coating, including an improved abrasion resistance of the coating. Furthermore, improving the ease of cleaning of such substrates while using less detergents, water or manual labor, is not only a desire by the end consumer, but has also a positive impact on the environment. The compositions can conveniently be applied in an easy and safe way and are compatible with existing manufacturing methods. Preferably, the compositions will fit easily into the manufacturing processes that are practiced to produce the substrates to be treated. The compositions preferably also avoid the use of ecologically objectionable components.

DEFINITIONS

"Alkyl" means a linear or branched, cyclic or acyclic, saturated monovalent hydrocarbon radical having from one to about twelve carbon atoms, e.g., methyl, ethyl, 1-propyl, 2-propyl, pentyl, and the like.

"Alkylene" means a linear saturated divalent hydrocarbon radical having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Alkoxy" means an alkyl having a terminal oxygen atom, e.g. $CH_3$—O—, $C_2H_5$—O—, and the like.

"Cured chemical composition" means that the chemical composition is dried or solvent has evaporated from the chemical composition from ambient temperature or higher until dryness. The composition may further be crosslinked as result of siloxane bonds formed between the perfluoropolyether compounds and the silsesquioxane hardcoat resin component.

"Oxyalkyl" has essentially the meaning given above for alkyl except that one or more oxygen heteroatoms may be present in the alkyl chain, these heteroatoms being separated from each other by at least one carbon, e.g., $CH_3CH_2OCH_2CH_2$—, $CH_3CH_2OCH_2CH_2OCH(CH_3)CH_2$—, $C_4H_9CH_2OCH_2CH_2$—, and the like.

"Oxyalkylene" has essentially the meaning given above for alkylene except that one or more oxygen heteroatoms may be present in the alkylene chain, these heteroatoms being separated from each other by at least one carbon, e.g., —$CH_2OCH_2O$—, —$CH_2CH_2OCH_2CH_2$—, —$CH_2CH_2OCH_2CH_2CH_2$—, and the like.

"Halo" means fluoro, chloro, bromo, or iodo, preferably fluoro and chloro.

"Perfluorinated group" means an organic group wherein all or essentially all of the carbon bonded hydrogen atoms are replaced with fluorine atoms, e.g. perfluoroalkyl, perfluorooxyalkyl, and the like.

"Perfluoroalkyl" has essentially the meaning given above for "alkyl" except that all or essentially all of the hydrogen atoms of the alkyl radical are replaced by fluorine atoms and the number of carbon atoms is from 1 to about 12, e.g. perfluoropropyl, perfluorobutyl, perfluorooctyl, and the like.

"Perfluoroalkylene" has essentially the meaning given above for "alkylene" except that all or essentially all of the hydrogen atoms of the alkylene radical are replaced by fluorine atoms, e.g., perfluoropropylene, perfluorobutylene, perfluorooctylene, and the like.

"Perfluorooxyalkyl" has essentially the meaning given above for "oxyalkyl" except that all or essentially all of the hydrogen atoms of the oxyalkyl radical are replaced by fluorine atoms and the number of carbon atoms is from 3 to about 100, e.g. $CF_3CF_2OCF_2CF_2$—, $CF_3CF_2O(CF_2CF_2O)_3CF_2CF_2$—, $C_3F_7O(CF(CF_3)CF_2O)_sCF(CF_3)CF_2$—, where s is (for example) from about 1 to about 50, and the like.

"Perfluorooxyalkylene" has essentially the meaning given above for "oxyalkylene" except that all or essentially all of the hydrogen atoms of the oxyalkylene radical are replaced by fluorine atoms, and the number of carbon atoms is from 3 to about 100, e.g., —CF$_2$OCF$_2$—, or —[CF$_2$—CF$_2$—O]$_b$—[CF(CF$_3$)—CF$_2$—O]$_c$—; wherein b and c are (for example) integers of 1 to 50.

"Perfluoroether" is a group having at least one perfluorooxyalkylene group; e.g perfluoroethers and perfluoropolyethers.

"Perfluoropolyether" is a group having at least two perfluorooxyalkylene groups.

DETAILED DESCRIPTION

The perfluoropolyether silane component is of the formula:

wherein:
R$_f$ is a monovalent or divalent perfluoropolyether group;
R$^1$ is a divalent alkylene group, arylene group, or combinations thereof, optionally containing one or more heteroatoms or functional groups and optionally substituted with halides, and preferably containing about 2 to about 16 carbon atoms;
R$^2$ is a lower alkyl group e.g. a C$_1$-C$_4$ alkyl group,
Y is a hydrolysable group, such as an alkoxy, acyloxy or halo group;
x is 0 or 1; and y is 1 or 2.

The perfluoropolyether group (R$_f$) can include linear, branched, and/or cyclic structures, that may be saturated or unsaturated, and substituted with one or more oxygen atoms. It is a perfluorinated group (i.e., all C—H bonds are replaced by C—F bonds). More preferably, it includes perfluorinated repeating units selected from the group of —(C$_n$F$_{2n}$O)—, —(CF(Z)O)—, —(CF(Z)C$_n$F$_{2n}$O)—, —(C$_n$F$_{2n}$CF(Z)O)—, —(CF$_2$CF(Z)O)—, and combinations thereof. In these repeating units Z is a perfluoroalkyl group, an oxygen-substituted perfluoroalkyl group, a perfluoroalkoxy group, or an oxygen-substituted perfluoroalkoxy group, all of which can be linear, branched, or cyclic, and may have about 1 to about 9 carbon atoms and 0 to about 4 oxygen atoms, and n is 1 to 9, and preferably about 1 to about 6, more preferably 1 to 4.

Examples of perfluoropolyethers containing polymeric moieties made of these repeating units are disclosed in U.S. Pat. No. 5,306,758 (Pellerite). Preferably the number of repeat units in the perfluoropolyether group (R$_f$) is sufficient to form a compound having a number average molecular weight of at least about 500, and more preferably, sufficient to form a perfluoropolyether group having a number average molecular weight of at least about 1000. For the monovalent perfluoropolyether group (wherein y is 1 in Formula I above), the terminal groups can be (C$_n$F$_{2n+1}$)—, (C$_n$F$_{2n+1}$O)—, (X'C$_n$F$_{2n}$O)—, or (X'C$_n$F$_{2n+1}$)— wherein X' is H, Cl, or Br, and n is an integer of 1 to 6, more preferably 1 to 4. Preferably, these terminal groups are perfluorinated.

Preferred approximate average structures for a divalent perfluoropolyether group include units of —CF$_2$O(CF$_2$O)$_a$(C$_2$F$_4$O)$_b$CF$_2$—, —CF(CF$_3$)(OCF$_2$CF(CF$_3$))$_c$O(CF$_2$)$_n$O(CF(CF$_3$)CF$_2$O)$_c$—, where n is 1-6; —CF$_2$O(C$_2$F$_4$O)$_b$CF$_2$—, and —(CF$_2$)$_3$O(C$_4$F$_8$O)$_d$(CF$_2$)$_3$—, wherein an average value for a, b, c and d is 0 to about 50, all of a, b, c and d cannot be 0 in the same group, and a+b+c+d is at least 1, preferably at least 2, and most preferably 10 to 50, and n is 1 to 9, preferably 1 to 4. It will be understood that the value of the "c" subscript in "(OCF$_2$CF(CF$_3$))$_c$" is selected independently from the value of the "c" subscript in "(CF(CF$_3$)CF$_2$O)$_c$".

Of these, particularly preferred approximate average structures are
—CF$_2$O(CF$_2$O)$_a$(C$_2$F$_4$O)$_b$CF$_2$—, —CF$_2$O(C$_2$F$_4$O)$_b$CF$_2$—, and
—CF(CF$_3$)(OCF$_2$CF(CF$_3$))$_c$O(CF$_2$)$_n$O(CF(CF$_3$)CF$_2$O)$_c$CF(CF$_3$)—, where a, b, c and d is 0 to about 50, all of a, b, c and d cannot be 0 in the same group, and a+b+c+d is at least 1, preferably at least 2, and most preferably 10 to 50.

Particularly preferred approximate average structures for a monovalent perfluoropolyether group include C$_3$F$_7$O(CF(CF$_3$)CF$_2$O)$_c$CF(CF$_3$)— and CF$_3$O(C$_2$F$_4$O)$_b$CF$_2$— wherein an average value for b and c is 1 to about 50, preferably at least 2, and most preferably 10 to 50. As synthesized, these compounds typically include a mixture of polymers. The approximate average structure is the approximate average of the mixture of polymers and the number may be non-integral.

Compounds of Formula I suitable for use in making a release agent useful in the present invention have a molecular weight (number average) of at least about 500, and preferably, at least about 1000. Typically, they are no greater than about 5000, but this is typically limited by availability, viscosity, and ease of cure, and preferably, no greater than about 3000, depending upon the viscosity and cure time characteristics desired.

Examples of preferred perfluoropolyether silanes include, but are not limited to, the following approximate average structures:
XCF$_2$O(CF$_2$O)$_a$(C$_2$F$_4$O)$_b$CF$_2$X, C$_3$F$_7$O(CF(CF$_3$)CF$_2$O)$_c$CF(CF$_3$)X
XCF(CF$_3$)(OCF$_2$CF(CF$_3$))$_c$O(CF$_2$)$_n$O(CF(CF$_3$)CF$_2$O)$_c$CF(CF$_3$)X,
XCF$_2$O(C$_2$F$_4$O)$_b$CF$_2$X, and CF$_3$O(C$_2$F$_4$O)$_b$CF$_2$X, X(CF$_2$)$_3$O(C$_4$F$_8$O)$_d$(CF$_2$)$_3$X, wherein —X is —R$^1$—Si(Y)$_{3-x}$(R$^2$)$_x$ as defined above in Formula 1 or a nonsilane-containing terminal group as defined above (C$_n$F$_{2n+1}$)— or (X'C$_n$F$_{2n}$O)— wherein X' is H, Cl, or Br), with the proviso that at least one X group per molecule is a silane, where a, b, c and d is 0 to about 50, all of a, b, c and d cannot be 0 in the same group, and a+b+c+d is at least 1, preferably at least 2, and most preferably 10 to 50.

In certain embodiments, an average value of a, b, c and d are each within a range of about 1 to about 50, and the sum of a, b, c and d is within a range of about 10 to about 50. As these are polymeric materials, such compounds exist as mixtures upon synthesis, which are suitable for use. These mixtures may also contain perfluoropolyether chains bearing no functional groups (inert fluids) or more than two terminal groups (branched structures) as a consequence of the methods used in their synthesis. Typically, mixtures of polymeric materials containing less than about 10% by weight of non-functionalized polymers (e.g., those without silane groups, for example) can be used. Furthermore, mixtures of any of the individually listed compounds of formula I can be used.

Perfluoropolyether compounds can be obtained by oligomerization of hexafluoropropylene oxide (HFPO) which results in a perfluoropolyether carbonyl fluoride as described in U.S. Pat. No. 3,250,808 (Moore et al.), incorporated herein by reference. This carbonyl fluoride may be converted into an acid, acid salt, ester, amide or alcohol by reactions well known to those skilled in the art. The carbonyl fluoride or acid, ester or alcohol derived therefrom may then be reacted further to introduce the desired groups according to known procedures.

The compounds of Formula I can be synthesized using standard techniques. For example, commercially available or readily synthesized perfluoropolyether esters can be combined with a functionalized alkoxysilane, such as a 3-aminopropylalkoxysilane, according to U.S. Pat. No. 3,810,874 (Mitsch et al.). Modifications of this method are described in the Examples.

It will be evident to one skilled in the art that a mixture of perfluoropolyethers according to Formula (I) may be used to prepare the fluorinated polyether compound of the fluorochemical composition. Generally, the method of making the perfluoropolyether according to Formula (I) for the present invention will result in a mixture of perfluoropolyethers that have different molecular weights and are free of (1) fluorinated polyether compounds having a perfluorinated polyether moiety having a molecular weight of less than 750 g/mol and (2) fluorinated polyether compounds having a perfluoropolyether moiety having a molecular weight greater than 10,000 g/mol.

In some embodiments, a combination of mono- and disilanes of Formula 1 is preferred. It has been found that compositions comprising a mixture of compounds of Formula 1, where y is 1 and 2 allow for the provision of fluorine-containing coatings showing unexpectedly significantly better performance in regard to contact angle and release (e.g. lower surface energy and easier to clean surfaces) than coatings made based on each of the individual compounds. Without wishing to bound to any particular theory, it seems that the particular combination of the aforesaid particular monofunctional and bifunctional polyfluoropolyether silanes act together effectively to allow for efficient coverage as well as extensive bonding (e.g. covalent bonding) to the surface of the substrate and cross-linking within the coating itself to provide very desirable structural integrity (e.g. desirable durability and flexural strength), while at the same time allowing for a particular highly fluorinated coating-surface.

In these embodiments favorable embodiments comprising a coating comprising a mixture of a mono- and disilane polyfluoropolyether silane have a weight percent ratio of the mono- to disilane equal to or greater than 10:90, in particular equal to or greater than 20:80, more particularly equal to or greater than 30:70, most particularly equal to or greater than 40:60. The embodiments include a coating comprising mono- and di-perfluoropolyether silane having the weight percent ratio of the mono- to di-perfluoropolyether equal to or less than 99:1, in particular equal to or less than 97:3, most particularly equal to or less than 95:5.

The use of perfluoropolyethers corresponding to molecular weights greater than about 5,000 g/mol can induce processing problems. These problems are typically due to the fact that the higher molecular weight materials lead to insolubility concerns, as well as in difficulty in purification due to the low vapor pressure of these higher molecular weight compounds, which retards the efficiency of the purification process of materials via fractionation.

The perfluoropolyether silanes are desirably free of or substantially free of perfluoropolyether moieties having a molecular weight of less than 500 g/mol and those moieties having a molecular weight greater than 5000 g/mol. By the term "substantially free of" is meant that the particular perfluoropolyether moieties outside the molecular weight range are present in amounts of not more than 10% by weight, preferably not more than 5% by weight and based on the total weight of perfluoropolyether moieties in the composition. Compositions that are free of or substantially free of these moieties are preferred because of their beneficial environmental properties and their processability in the further reaction steps.

The divalent $R^1$ group of Formula I can include linear, branched, or cyclic structures, that may be saturated or unsaturated. The $R^1$ group can contain one or more catenary heteroatoms (e.g., in-chain oxygen, nitrogen, or sulfur) or one or more functional groups (e.g., carbonyl, amido, or sulfonamido). It can also be substituted with halogen atoms, preferably, fluorine atoms, although this is less desirable, as this might lead to instability of the compound. Preferably, the divalent $R^1$ group is a hydrocarbon group, preferably, a linear alkylene group, optionally containing heteroatoms or functional groups, and more preferably, containing at least one functional group. Examples of $R^1$ groups include —C(O)NH—$R^3$—, —CH$_2$O—$R^3$—, and —(C$_n$H$_2$)—, where $R^3$ is a linear or branched alkylene group having 1 to six carbon atoms, optionally substituted by one or more catenary oxygen or nitrogen atoms, and wherein n is about 2 to about 6. A preferred $R^1$ group is —C(O)NH—(C$_n$H$_{2n}$)—, where n is 1 to 6.

In some embodiments, each silane $R^1$ group preferably includes a carboxamide functional group. More particularly, at least one X group per molecule is C(O)NH—$R^3$—Si(OR)$_3$ (wherein R is methyl, ethyl, or mixtures thereof), and the other X group if not a silane is —OCF$_3$ or —OC$_3$F$_7$. The values of a, b, c and d in these approximate average structures can vary, as long as the material has a number average molecular weight of at least about 500.

Although the inventors do not wish to be bound by theory, compounds of the above Formula I are believed to undergo reaction with the substrate surface and the silsesquioxane hardcoat resin component to form a siloxane coating of the substrate surface, such as through the formation of covalent bonds. In this context, "siloxane" refers to —Si—O—Si— bonds to which are attached perfluoropolyether segments (such as the $R_f$ groups in Formula I herein), preferably, perfluoropolyether segments, bonded to the silicon atoms through organic linking groups optionally containing heteroatoms or functional groups (such as the $R^1$ groups in formula I herein). In a cured coating (or an at least partially cured coating), the perfluoropolyether segments preferably have a number average molecular weight of at least about 500. In particularly preferred embodiments, the $R^1$ groups include nitrogen atoms (as in an amido group), and the ratio of fluorine atoms to nitrogen atoms in the coating is within a range of about 25 to about 150. A coating prepared from a coating composition that includes compounds of formula I can also include unreacted or uncondensed silanol groups.

The coating compositions of this disclosure contain silsesquioxane hardcoat resin component, which is a co-condensate of a silsesquioxane and nanoparticle silica. Useful silsesquioxanes include e.g., condensates of trialkoxysilanes of the formula $R^{10}$Si(OR$^{11}$)$_3$ (or hydrolysates thereof) and nanoparticle silica; co-condensates of diorganooxysilanes (or hydrosylates thereof) of the formula $R^{10}_2$Si(OR$^{11}$)$_2$ with trialkoxysilanes (or hydrosylates thereof) and colloidal silica; and tetralkoxysilanes of the formula Si(OR$^{11}$)$_4$ with trialkoxysilanes (or hydrosylates thereof) and colloidal silica; and mixtures thereof. The condensates and co-condensates are of the unit formula $R^{10}$SiO$_{3/2}$ where each $R^{10}$ is an alkyl group of 1 to 6 carbon atoms or an aryl group and $R^{11}$ represents an alkyl radical with 1 to 4 carbon atoms.

More particularly, such silsesquioxane are the fully- or partially-hydrolyzed condensation reaction product of one or more and optionally one or more tetralkoxysilanes trialkoxysilanes and optionally one or more dialkoxysilanes. Such silsesquioxanes may be represented by the general formula:

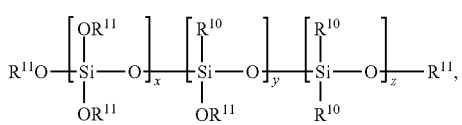

where
each $R^{11}$ is individually H, $C_1$ to $C_4$ alkyl, or an alkali metal cation, and alkali earth metal cation or ammonium cation;
each $R^{10}$ is $C_1$ to $C_4$ alkyl,
z is 2 to 100, preferably 3 to 15,
x and y may be zero,
z is greater than x+y,
x+y+z is 2 to 100, preferably 3 to 15.

A useful method of making the silsesquioxane hardcoat resin component includes hydrolysis of the alkoxysilanes in the presence of a nanoparticle silica dispersion and in a mixture of water and alcoholic solvents. The nanoparticle silica dispersions preferably have a particle size from 5 nm to 100 nm, or preferably from 10 nm to 30 nm. The smaller nanoparticles, those of 30 nanometers or less, generally provide better coatings, and improved appearance with respect to haze and coating thickness variability; better adhesion or durability to the coated substrate; and better performance with respect to cleanability. Further, the nanoparticles generally have a surface area greater than about 150 m²/gram, preferably greater than 200 m²/gram, and more preferably greater than 400 m²/gram. The particles preferably have narrow particle size distributions, that is, a polydispersity of 2.0 or less, preferably 1.5 or less.

Another useful method of preparing a silsesquioxane hardcoat resin component includes adding hydrolysable alkoxysilanes to a mixture of nanoparticle silica dispersion, water and optionally materials such as surface active agent and organic water-miscible solvent, while agitating the mixture under acidic or basic conditions. The exact amount of alkoxysilanes that can be added depends on the substituent R and whether an anionic or cationic surface-active agent is used. Co-condensates of the silsesquioxanes in which the units can be present in block or random distribution are formed by the simultaneous hydrolysis of the alkoxysilanes. The amount of tetraorganosilanes (including, e.g., tetraalkoxysilanes and hydrosylates thereof (e.g. tetraalkoxysilanes of the formula $Si(OH)_4$, and oligomers thereof) present is less than 10% by weight, less than 5% by weight, or even less than about 2% by weight based on the solids of the silsesquioxane-based hard-coat component. After hydrolysis is complete, the product may be diluted with additional solvent and additives may be added including, e.g., UV absorbers, buffers (e.g., methyltriacetoxysilane (e.g., for silsesquioxane-based hard-coat compositions that are made with basic nanoparticle silica), antioxidants, cure catalysts (e.g., amine carboxylates such as ethylamine carboxylate, and quaternary ammonium carboxylates such as benzyltrimethylammonium acetate), and combinations thereof.

Useful nanoparticle silica dispersions are commercially available under a variety of trade designations from E. I. duPont and Nalco Chemical including LUDOX™ from E. I. duPont de Nemours and Co., Inc. (Wilmington, Del.), NYACOL™ available from Nyacol Co., (Ashland, Mass.) and the NALCO™ from Nalco Chemical Co. (Oak Brook, Ill.). Useful silsesquioxanes can be made by a variety of techniques including the techniques described in U.S. Pat. No. 3,986,997 (Clark), U.S. Pat. No. 4,624,870 (Anthony) and U.S. Pat. No. 5,411,807 (Patel et al.), and incorporated by reference.

Trialkoxysilanes useful in preparing the silsesquioxane hardcoat resin component include, e.g., methyltrimethoxysilane, methyltriethoxysilane, methyltriisopropoxyoxysilane, ethyltrimethoxysilane, ethyltriethoxysilane, propyltrimethoxysilane, isobutyltrimethoxysilane, isobutyltriethoxysilane, 2-ethylbutyltriethoxysilane, 2-ethylbutoxytriethoxysilane, and combinations thereof. Analogous di- and tetraalkoxysilanes may be used as previously described. Commercially available silicone hardcoat compositions that may be used in the present disclosure include SHC-12™ SHC-5020™ and AS4000™ hardcoats from GE Bayer Silicones, Waterford, N.Y. and PHC587™ from Momentive Performance Materials, Albany, N.Y.

The silsesquioxane-based hardcoat resin component is present composition in an amount of from about 90% by weight to about 99.9% by weight based on the total solids of the hard-coat compositions. Generally the silsesquioxane hardcoat resin component comprises 1 to 20 wt. % silica nanoparticles and 80-99 wt. % silsesquioxane.

It is preferred that the weight ratio of perfluoropolyether silane compounds (A) to the silsequioxane hardcoat resin component (B) in the preparation of the reaction product is 1:10 to 1:100 and particularly preferred 1:20 to 1:100. Typically, component (B) comprises more than 90 weight percent and more preferably more than 95 weight percent based on the total weight of the components used (A and B).

The coating composition is typically a relatively dilute solution, containing between 0.01 and 5 percent by weight of the perfluorpolyether silane and 1 to 40 percent by weight of the silsesquioxane hardcoat resin component. The weight percents of the components are generally limited by the solubility of the perfluoropolyethersilane in the solvent, and the tendency of the silsesquioxane resin component to gel at higher concentrations.

A composition of the present invention optionally includes one or more organic solvents. The organic solvent or blend of organic solvents preferred must be capable of dissolving at least 0.01% of the perfluoropolyetherether silane of Formula I. In addition, the organic solvent lowers the viscosity of the dilutable, non-aqueous concentrate. Suitable organic solvents, or mixtures of solvents are polar organic solvents and can include aliphatic alcohols, such as methanol, ethanol, isopropyl alcohol; ketones such as acetone or methyl ethyl ketone; esters, such as ethyl acetate, methylformate and ethers, such as diisopropyl ether, 1,4-dioxane, and diethylene glycol dimethyl ether; and amides, such as N-methylpyrrolidinone, and N,N-dimethylformamide and mixtures thereof. Fluorinated solvents such as, for example, heptafluorobutanol, trifluoroethanol and hexafluoroisopropanol, may be used alone or in combination with other non-fluorine containing organic solvents in order to improve solubility of the fluorinated polyether silane.

Preferred organic solvents are aliphatic alcohols. Some examples of preferred aliphatic alcohols are ethanol, and isopropyl alcohol. Preferably, the organic solvent is water miscible. Also, preferably, the organic solvent has a boiling point that is below 200° C.

For ease of manufacturing and for reasons of cost, the compositions of the present invention can be prepared shortly before use by diluting a concentrate of one or more of the perfluoropolyether silanes and silsesquioxanes hardcoat resin. The concentrate will generally comprise a concentrated solution of the perfluoropolyether silanes and silsesquioxanes hardcoat resin in an organic solvent. The concentrate should be stable for several weeks, preferably at least 1 month, more preferably at least 3 months.

Suitable substrates that can be treated with the coating composition include substrates having a hard surface. Useful substrates include ceramics, glazed ceramics, glass, metals (such as aluminum, iron, stainless steel, copper and the like), natural and man-made stone, thermoplastic materials (such as poly(meth)acrylate, polycarbonate, polystyrene, styrene copolymers such as styrene/acrylonitrile copolymers, and polyesters such as polyethylene terephthalate.

For some embodiments, the metal and/or metal alloy is selected from the group consisting of chromium, chromium alloys, iron, aluminum, copper, nickel, zinc, tin, stainless steel, and brass. In some embodiments, the metal and/or metal alloy comprises at least one of gold, platinum, chromium, aluminum, copper, silver, titanium, indium, germanium, tin, nickel, indium tin. In some embodiments, the surface comprises stainless steel. In some embodiments, the surface comprises at least one of a metal or metal oxide, and the coating composition forms at least a partial monolayer on the surface. For some embodiments, a major surface of the metal substrate comprises chromium. An article with a metal surface may comprise other materials (e.g., under the metal surface) which include thermoset and thermoplastic polymers, ceramic, porcelain, as well as other materials capable of having a metallized surface. Examples of articles having metal surfaces include kitchen and bathroom faucets, taps, handles, spouts, sinks, drains, hand rails, towel holders, curtain rods, dish washer panels, refrigerator panels, stove tops, stove, oven, and microwave panels, exhaust hoods, grills, and metal wheels or rims.

Metal substrates and metallized substrates are found in a variety of environments, including kitchens and bathrooms, as well as outdoor areas, where they can come in contact with aqueous residues such as food, soap, and minerals (e.g., lime). Removing such deposits from, for example, faucets, shower heads, and hand rails, often requires aggressive scrubbing, frequently with acidic cleaners or detergents, and often challenge the esthetic appearance and durability of the surface of these substrates. Compositions, methods, and articles according to the present disclosure typically provide easy-to-clean metal surfaces, which allow removal of aqueous and oily deposits (e.g., mineral deposits and fingerprints) with a wipe without the need for aggressive scrubbing and without the need for aggressive acidic cleaners and which retain this property with repeated wipes. The easy-to-clean properties provided by the compositions according to the present invention are surprisingly better than those provided by other phosphonate-containing perfluoroethers reported in U.S. Pat. App. Pub. No. 2005/0048288 (Flynn et al). Since compositions according to the present invention can render metal surfaces resistant to soils, the optical properties of metal surfaces like those on decorative metal strips and mirrors can be preserved longer.

Treatment of the substrates results in rendering the treated surfaces less retentive of soil and more readily cleanable due to the oil and water repellent nature of the treated surfaces. These desirable properties are maintained despite extended exposure or use and repeated cleanings because of the high degree of durability of the treated surface as can be obtained through the compositions of this invention. Hard substrates having a cured coating thereon have been found to be at least one of non-staining, stain-releasing with simple washing methods, oil resistant (e.g., resistant to fingerprints), resistant to lime deposits, or resist being worn-off due to wear and abrasion from use, cleaning, and the elements.

Preferably, the substrate should be cleaned prior to applying the compositions of the invention so as to obtain optimum characteristics, particularly durability. That is, the surface of the substrate to be coated should be substantially free of organic and inorganic contamination prior to coating. Cleaning techniques depend on the type of substrate and include, for example, a solvent washing step with an organic solvent, such as acetone or ethanol, or a reactive gas-phase treatment such as UV/ozone.

The above-described compositions are coated on a substrate using conventional coating techniques modified as appropriate to the particular substrate. For example, these compositions can be applied to a variety of solid substrates by methods such as roller coating, flood coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described. A substrate to be coated can typically be contacted with the composition at room temperature (typically, about 20 to about 25° C.). Following application, the treated substrate can be dried and cured at ambient or elevated temperature, e.g. at 40 to 200° C., depending on the thermal stability of the substrate and for a time sufficient to cure. The process may also include a polishing step to remove excess material.

The overall coating thickness of the coating is greater than a monolayer (which is typically greater than about 15 Angstroms thick). That is, preferably, a coating of the present invention is at least about 20 Angstroms thick, and more preferably, at least about 30 Angstroms thick. Preferably, it is less than about 200 Angstroms thick, and more preferably, less than about 100 Angstroms thick. The coating material is typically present in an amount that does not substantially change the appearance of the coated article.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

All parts, percentages, ratios, etc. in the examples and the rest of the specification are by weight, unless noted otherwise. Solvents and other reagents used were obtained from Aldrich Chemical Company, Milwaukee, Wis. unless otherwise noted.

Materials

"PHC-587": a silicone hard coat purchased from Momentive Performance Materials, Waterford, N.Y. "PHC-587" is 29 wt % methylsilsesquioxane resin delivered in mixture of alkyl alcohol solvents.

"FMS-9921", poly(trifluoropropylmethylsiloxane), is a silanol terminated fluorosilicone, obtained from Gelest, Morrisville, Pa.

"ECC-4000": an easy clean coating fluoropolymers solution which can be used for glass and ceramic substrates, is obtained from 3M Company, St.Paul, Minn.

HFPO—refers to the end group—$F(CF_3)CF_2O)_aCF(CF_3)$— of the methyl ester $F(CF(CF_3)CF_2O)_aCF(CF_3)C(O)OCH_3$, wherein a averages from 4-20, which can be prepared according to the method reported in U.S. Pat. No. 3,250,808, the disclosure of which is incorporated here in by reference, with purification by fractional distillation.

HFPO dimethylester: $CH_3O(O)CCF(CF_3)(OCF_2CF(CF_3))_b$ $OCF_2CF_2CF_2CF_2O(CF(CF_3)CF_2O)_cCF(CF_3)COOCH$, also referred to as $H_3CO(O)C$—HFPO—$C(O)OCH_3$ or HFPO—$(C(O)OCH_3)_2$, in which b+c average from about 4 to 15 can be prepared using $FC(O)CF_2CF_2C(O)F$ as an starting material according to the method reported in U.S. Pat. No. 3,250,807 (Fritz, et al.) which provides the HFPO oligomer bis-acid fluoride, followed by methanolysis and purification by removal of lower boiling materials by fractional distillation as described in U.S. Pat. No. 6,923,921 (Flynn, et. al.).

HFPO—$CONHCH_2CH_2Si(OCH_3)_3$: A 100 mL 3 necked round bottom flask was equipped with magnetic stir bar, $N_2$ inlet and reflux condenser was charged with HFPOCOOMe (20 g, 0.01579 moles) and $NH_2CH_2CH_2CH_2$—$Si(OCH_3)_3$ (2.82 g, 0.01579 moles) under $N_2$ atmosphere. The reaction mixture was heated at 75° C. for 12 h. The reaction was monitored by IR and after the disappearance of ester peak, clear viscous oil was kept at high vacuum for another 8 hours and used as such. HFPO—$CONHCH_2CH_2$—NH—$CH_2CH_2Si(OCH_3)_3$: This compound was prepared using a similar procedure described in U.S. Pat. No. 3,646,085. A 100 mL 3 necked round bottom flask was equipped with magnetic stir bar, $N_2$ inlet and reflux condenser was charged with HFPOCOOMe (20 g, 0.01579 moles) and $NH_2CH_2CH_2$—NH—$CH_2CH_2$—$Si(OCH_3)_3$ (3.5 g, 0.01579 moles) under $N_2$ atmosphere. The reaction mixture was heated at 75° C. for 12 h. The reaction was monitored by IR and after the disappearance of ester peak, clear viscous oil was kept at high vacuum for another 8 hours and used as such.

Alpha-Omega HFPO—$[CONHCH_2CH_2$—NH—$CH_2CH_2Si(OCH_3)_3]_2$: This compound was prepared using a similar procedure described in Patent Publication US2005/0233070 A1. A 100 mL 3 necked round bottom flask was equipped with magnetic stir bar, $N_2$ inlet and reflux condenser was charged with $HFPO[COOMe]_2$ (20 g, 0.01579 moles) and $NH_2CH_2CH_2$—NH—$CH_2CH_2$—$Si(OCH_3)_3$ (3.5 g, 0.01579 moles) under $N_2$ atmosphere. The reaction mixture was heated at 75° C. for 12 h. The reaction was monitored by IR and after the disappearance of ester peak, clear viscous oil was kept at high vacuum for another 8 hours and used as such.

Aminopropyltrimethoxysilane purchased from Aldrich Chemical Company, Milwaukee, Wis.

Test Methods

Method for Coating Test Samples

First, the stainless steel panels to be coated were cleaned with IPA to ensure there is no contamination on the surface. The cleaned panels were dried at room temperature before coating. A "WALTHER PILOT SPRAYING GUN" (obtained from Walther Pilot North America, Mich.), was used to spray coat the coating compositions prepared according to the disclosure on the stainless steel panel surfaces. The distance between the spray nozzle and the stainless steel substrate surfaces was roughly 20 cm, at a pressure of 1.97 atmospheres (~2 kPa). Two coats were made (two spray nozzle travels). After the coating was dry to touch, the coated panels were placed in an oven of 130° C. for 30 minutes to cure the coating composition.

Method for Abrasion (Durability) Testing

To measure the abrasion resistance of coatings resulting from the coating compositions according to the invention, a coated (coated according to the method described above) stainless steel plate was fixed on an abrasion tester (obtained from BYK-Gardener GmbH, Geretsried, Germany, under the trade designation "BYK-GARDENER ABRASION TESTER") and scrubbed for 3000 cycles with dry high performance cloth (commercially available from 3M Company, St. Paul, Minn. under the trade designation "SCOTCH BRITE"). The scrubbing cycles were carried out with 1 Kg force. The contact angles were measure before and after the abrasion.

Method for Determining the Easy Cleaning Ranking (EZC Rank)

The EZC Ranking of the coatings prepared from the coating compositions of the invention (coatings prepared according to the method described above) were determined before and after the abrasion testing by drawing lines across the samples using a colored sharpie marker. The ink from the sharpie marker was then cleaned off by wiping them. An EZC Ranking of 1 indicates that the sample was very easy to clean, while an EZC Ranking of 5 indicates the sample was very difficult to clean.

Method for Measuring Contact Angles

The samples for measuring the contact angles were prepared by coating the coating compositions on stainless steel substrates according to the method described above. Measurements were made using as-received reagent-grade hexadecane and deionized water filtered through a filtration system (obtained from Millipore Corporation, Billerica, Mass.), on a video contact angle analyzer (available as product number "DSA 100E" obtained from Kruss GmbH, Hamburg, Germany). Reported values are the averages of measurements on at least three drops measured on the right and the left sides of the drops. Drop volumes were 5 µL for static contact angle measurements and 1-3 µL for advancing and receding contact angle measurements. The average of 3 measurements was reported.

Method for Release (Peel) Strength Tests

The test was performed on a "SP-2000 PEEL TESTER" (obtained from IMASS, Inc., Accord, Mass.). A 1.24 cm strip of "3M 845" book tape, commercially available from 3M Company, St. Paul, Minn., was rolled down on a coated panel with a 1 Kg roller. The roller was passed twice on the tape. The peel test was run at 216 cm/60 sec for 5 seconds with a 0.5 second delay to tension the tape. For each test the kinetic peak (highest value), valley (lowest value) and average of all measurements were reported. Results are expressed in g/cm.

Method for Fingerprint Resistance Test

To measure the fingerprint resistance of the coatings applied on stainless steel substrates according to this invention were determined as follows: a solution (Solution A) mimicking fingerprint composition was prepared by mixing 0.1 g of "MBX-20 PMMA BEADS" (obtained from Seiksui Plastics, Japan), 0.6 g Triolein (obtained from Sigma Chemicals, St. Louis, Mo.) and 8 g IPA (obtained from Aldrich Chemical Company, Milwaukee, Wis.). The Solution A was then applied on a polyethylene terephthalate (PET) film (#618 from DuPont, Wilmington, Del.) by pulling a # 5 wire wound rod rapidly over the PET film. The coated PET film was dried under hood for at least 30 minutes. A 1 kg plunger (obtained from Summer Optical, Fort Washington, Pa.), with a #5 rubber stopper (obtained from VWR Scientific, Batavia, Ill.) attached to it, was pressed on to the coated PET (inking the stopper). Then, the plunger was pressed on to the stainless steel sample coated with the compositions of this invention as described above. The resulting impressions of solution A were rated by visual observation. A rating of 1 indicate no smudge detected while a fingerprint test rating of 4 indicate very obvious smudge.

Examples 1-7 and Comparative Examples A and B

Examples 1-7 and comparative examples A and B coating compositions were prepared by adding together desired quantities of isopropyl alcohol (IPA), "PHC-587" and the indicated fluorochemical siloxanes (FC). The coating compositions were then mixed for 16 hours in a shaker and then filtered using a filter paper ("WHATMAN" No1 obtained from VWR Scientific, Batavia, Ill.). The so prepared coating compositions for each example and comparative example were then coated on stainless steel panels as described above under method for coating test samples. The cured coated samples for each example and comparative examples were then tested for determining their easy clean ranking according to the process described above. In addition, the cured coated samples for each example and comparative example A were subjected to abrasion testing as described above and their after abrasion EZC ranking was determined using the method described above. Table 1 below summarizes the types and quantities of each component in coating compositions of examples 1-8 and comparative example A as well as their corresponding before (BA) and after abrasion (AA) EZC rankings

TABLE 1

| Example | FC Additive | FC (g) | "PHC-587" (g) | IPA (g) | EZC Rank BA | EZC Rank AA |
|---|---|---|---|---|---|---|
| 1 | HFPO—CONHCH$_2$CH$_2$Si(OCH3)3 | 0.1 | 9.9 | 90 | 1 | 2 |
| 2 | "ECC-4000" | 0.1 | 9.9 | 90 | 1 | 1 |
| 3 | "FMS-9921" | 0.1 | 9.9 | 90 | 2 | 4 |
| 4 | HFPO—CONHCH$_2$CH$_2$NHCH2CH2Si(OCH3)3 | 0.1 | 9.9 | 90 | 2 | 4 |
| 5 | Alpha-omega HFPO—CONHCH$_2$CH$_2$NHCH2CH2Si(OCH3)3 | 0.1 | 9.9 | 90 | 3 | 4 |
| 6 | HFPO—CONHCH$_2$CH$_2$Si(OCH3)3 | 0.5 | 9.5 | 90 | 3 | 5 |
| 7 | "ECC-4000" | 0.5 | 9.5 | 90 | 2 | 4 |
| Comp. A | Control | 0 | 10 | 90 | 5 | 5 |

Examples 8-20

The coating compositions of examples 8-20 were prepared in the same manner as examples 1-7 described above except that the FC additive was "ECC-4000" for all examples and the relative amounts of "ECC-4000" to "PHC-587" were varied. A portion of the coating compositions for each of examples were allowed to sit at room temperature for 3 weeks and their stability was monitored. A stability rating of "S" means the solution was stable, "T" means a turbid solution and "CL" means there was some cross linking Table 2 below summarizes the relative amounts of the "ECC-4000" and "PHC-587" as well as the stability ranking of coating compositions of examples 8-20. In Table 2, the amount of PHC-587 is the amount of a 30% solids by weight of a solution in isopropanol.

TABLE 2

| Example | "ECC-4000" g | "PHC-587" g (20% solids) | IPA g | Stability Rating |
|---|---|---|---|---|
| 8 | 0.5 | 12.5 | 87 | S |
| 9 | 1 | 12.5 | 86.5 | S |
| 10 | 2.5 | 12.5 | 85 | S |
| 11 | 0.5 | 25 | 74.5 | S |
| 12 | 1 | 25 | 74 | S |
| 13 | 2.5 | 25 | 72.5 | S |
| 14 | 0.5 | 50 | 49.5 | T |
| 15 | 1 | 50 | 49 | CL |
| 16 | 2.5 | 50 | 47.5 | CL |
| 17 | 0.5 | 99.5 | 0 | T |
| 18 | 1 | 99 | 0 | CL |
| 19 | 2.5 | 97.5 | 0 | CL |
| 20 | 1 | 10 | 89 | |

The coating compositions for examples 8-20 were coated and cured on stainless steel panels as described above under method for coating test samples and then tested for determining their static and dynamic water (W) and hexadecane (H) contact angles according to the process described above. In addition, the cured coated samples for examples 8-20 were subjected to abrasion testing as described above and their after abrasion water and hexadecane contact angles (static and dynamic) were determined using the method described above. Table 3 below summarizes both the static and dynamic (initial and after abrasion) water and hexadecane contact angles for coatings made from coating compositions of examples. Examples 8A and 9A were prepared in the same way as examples 8 and 9, except that they were coated twice (four passes of spray nozzle over the coating surface) with corresponding coating compositions.

TABLE 3

| | Initial Contact Angles | | | | | | After Abrasion Contact Angles | | | | | |
|---|---|---|---|---|---|---|---|---|---|---|---|---|
| | Static | | Dynamic | | | | Static | | Dynamic | | | |
| Example | W | H | W | H | W | H | W | H | W | H | W | H |
| 8 | 105 | 60 | 106 | 61 | 83 | 50 | 103 | 56 | 108 | 54 | 74 | 44 |
| 8A | 106 | 63 | 111 | 63 | 88 | 50 | 107 | 59 | 115 | 59 | 83 | 46 |
| 9 | 104 | 61 | 103 | 69 | 79 | 52 | 102 | 56 | 108 | 47 | 76 | 39 |
| 9A | 107 | 59 | 105 | 61 | 80 | 47 | 108 | 57 | 110 | 65 | 81 | 46 |
| 10 | 106 | 62 | 105 | 65 | 78 | 44 | 110 | 66 | 119 | 67 | 81 | 54 |
| 11 | 107 | 60 | 108 | 62 | 86 | 54 | 107 | 61 | 111 | 63 | 80 | 49 |
| 12 | 106 | 63 | 106 | 63 | 87 | 56 | 108 | 61 | 114 | 63 | 81 | 53 |
| 13 | 105 | 58 | 104 | 60 | 76 | 43 | 108 | 65 | 107 | 63 | 88 | 58 |
| 14 | 106 | 63 | 106 | 64 | 91 | 54 | 107 | 62 | 116 | 62 | 83 | 53 |
| 15 | 107 | 64 | 110 | 64 | 92 | 55 | 107 | 61 | 113 | 64 | 84 | 53 |
| 17 | 107 | 63 | 105 | 64 | 87 | 55 | 102 | 61 | 108 | 59 | 85 | 50 |
| 18 | 106 | 63 | 109 | 64 | 87 | 55 | 104 | 59 | 110 | 59 | 84 | 49 |
| 20 | 104 | 57 | 111 | 59 | 86 | 50 | 95 | 47 | 93 | 44 | 70 | 13 |

The cured coated samples for examples 8-20 were then tested for determining their release (peel) strength according to the process described above. In addition, the cured coated samples for examples 8-20 and comparative example A were subjected to abrasion testing as described above and their after abrasion release (peel) strength were determined using the method described above. Table 4 below summarizes release strength (initial and after abrasion) for coatings made from coating compositions of examples 8-20 and comparative example A.

TABLE 4

| | Initial Release Strength (g/cm) | | | After Abrasion Release Strength (g/cm) | | |
|---|---|---|---|---|---|---|
| Example | Kinetic Peak | Valley | Average | Kinetic Peak | Valley | Average |
| 8 | 88.7 | 32.8 | 62.4 | 153.2 | 112.8 | 135.7 |
| 8A | 100.2 | 23.1 | 63.3 | 197.1 | 95.2 | 153.9 |
| 9 | 113.7 | 19.7 | 57.3 | 176.8 | 95.2 | 135.3 |
| 9A | 21.7 | 4.4 | 11.7 | 141.2 | 72.3 | 114.5 |
| 10 | 36.3 | 4.4 | 16.2 | 118.7 | 44.0 | 92.0 |
| 11 | 82.4 | 23.9 | 52.2 | 158.5 | 103.1 | 122.4 |
| 12 | 26.1 | 7.2 | 15.5 | 105.1 | 85.1 | 96.9 |
| 13 | 13.3 | 2.0 | 7.7 | 71.8 | 46.6 | 57.9 |
| 14 | 63.7 | 30.5 | 46.4 | 164.0 | 27.3 | 136.5 |
| 15 | 71.8 | 30.2 | 46.9 | 164.0 | 63.1 | 122.0 |
| 16 | 23.2 | 2.2 | 12.7 | | | |
| 17 | 95.7 | 39.5 | 66.8 | 162.7 | 11.9 | 129.2 |
| 18 | 84.4 | 37.2 | 60.0 | 177.9 | 126.1 | 156.0 |
| 19 | 65.9 | 54.3 | 61.1 | 191.6 | 146.6 | 172.3 |
| Comp. A | 623.7 | 496.2 | 573.6 | | | |

Kinetic peak is the highest measured data point value during the peel test. Valley is the lowest measured data point value during the test. The average value is the average of all data points collected in the duration of the test.

Some of the cured coated samples for examples 8-20 and comparative example A were then tested for determining their fingerprint stain resistance according to the process described above. Table 5 below summarizes fingerprint stain resistance for coatings made from coating compositions of examples 8-20 and comparative example A.

TABLE 5

| Example | Fingerprint Resistance Ranking |
|---|---|
| 8 | 2 |
| 8A | 1 |

TABLE 5-continued

| Example | Fingerprint Resistance Ranking |
|---|---|
| 9 | 1 |
| 9A | 1 |
| 10 | 1 |
| 11 | 2 |
| 12 | 2 |
| 13 | 2 |
| 14 | 3 |
| 15 | 3 |
| 16 | 3 |
| 17 | 3 |
| Comparative A | 4 |

Steel Wool Durability Test

The abrasion resistance of the cured films of selected samples was tested cross-web to the coating direction by use of a mechanical device capable of oscillating a steel wool sheet adhered to stylus across the film's surface. The stylus oscillated over a 60 mm wide sweep width at a rate of 210 mm/sec (3.5 rubs/sec) wherein a "rub" is defined as a single travel of 60 mm. The stylus had a flat, cylindrical base geometry with a diameter of 3.2 cm. The stylus was designed for attachment of weights to increase the force exerted by the steel wool normal to the film's surface. The #0000 steel wool sheets were "Magic Sand-Sanding Sheets" available from Hut Products Fulton, Mo. The #0000 has a specified grit equivalency of 600-1200 grit sandpaper. The 3.2 cm steel wool discs were die cut from the sanding sheets and adhered to the 3.2 cm stylus base with 3M Brand Scotch Permanent Adhesive Transfer tape. A single sample was tested for each example, with a 1 kg weight and the number of rubs employed during testing as reported. The sample was then visually inspected for scratches and ink repellency.

TABLE 6

| Example # | 1 kg/25rubs | 1 kg/50rubs | 1 kg/100rubs |
|---|---|---|---|
| 8 | NS-IR | NS-IR | S-IR |
| 9 | NS-IR | NS-IR | S-IR |
| 12 | NS-IR | NS-IR | S-NIR |
| 14 | NS-IR | NS-IR | S-IR |
| 15 | S-IR | S-IR | S-NIR |
| 17 | NS-IR | NS-IR | NS-IR |
| 18 | NS-IR | NS-IR | NS-IR |

IR—ink repellent, PIR—partial ink repellent NS—No Scratch S—Scratch, NIR—not ink repellent

What is claimed is:

1. A coating composition comprising:
   a) A silsesquioxane hardcoat resin component comprising a co-condensate of a silsesquioxane with silica nanoparticles, and
   b) a perfluoropolyether silane of the formula:

   $$R_f\text{—}[\text{—}R^1\text{—}Si(Y)_{3-x}(R^2)_x]_y \qquad (I)$$

wherein:
   $R_f$ is a monovalent or divalent perfluoropolyether group;
   $R^1$ is —C(O)—NH—$R^3$-, where $R^3$ is a linear or branched alkylene of 1 to 6 carbon atoms;
   $R^2$ is a lower alkyl group,
   Y is a hydrolysable group;
   x is 0 or 1; and y is 1 or 2.

2. The coating composition of claim 1, wherein $R_f$ is a perfluoropolyether group comprising perfluorinated repeating units selected from the group consisting of —($C_nF_{2n}O$)—, —(CF(Z)O)—, —(CF(Z)$C_nF_{2n}$O)—, —($C_nF_{2n}$CF(Z)O)—, —($CF_2$CF(Z)O)—, and combinations thereof, wherein n is 1 to 6 and Z is a perfluoroalkyl group, a perfluoroalkoxy group, or perfluoroether group.

3. The coating composition of claim 1, wherein said perfluoroether moiety of is selected from:—$CF_2O(CF_2O)_a$ $(C_2F_4O)_bCF_2$—; —$CF_2O(C_2F_4O)_bCF_2$—, —CF($CF_3$)O—$(CF_2CF(CF_3)O)_c$—$C_nF_{2n}$O—$(CF(CF_3)CF_2O)_c$—CF$(CF_3)$—, and —$(CF_2)_3O(C_4F_8O)_d(CF_2)_3$—, wherein each of a, b, c and d may be zero, and a +b +c +d is at least 1, and n is 1 to 6.

4. The coating composition of claim 1, wherein $R_f$ is a monovalent perfluoropolyether group.

5. The coating composition of claim 1 wherein said silsesquioxane hardcoat resin component comprises:
   a) condensates of trialkoxysilanes of the formula $R^{10}Si(OR^{11})_3$ and nanoparticle silica; or
   b) co-condensates of diorganooxysilanes of the formula $R^{10}_2Si(OR^{11})_2$ with trialkoxysilanes or tetraalkoxysilanes and nanoparticle silica; and mixtures thereof
   where each $R^{10}$ is independently an alkyl group of 1 to 6 carbon atoms or an aryl group and each $R^{11}$ is independently an alkyl radical with 1 to 4 carbon atoms.

6. The coating composition of claim 1 wherein the silsesquioxane hardcoat resin component is of the formula $R^{10}SiO_{3/2}$ where each $R^{10}$ is an alkyl group of 1 to 6 carbon atoms or an aryl group.

7. The coating composition of claim 1 wherein the nanoparticle silica has an average particle size 100 nanometers or less.

8. The coating composition of claim 1 wherein the weight ratio of perfluoropolyether silane compounds b) to the silsesquioxane hardcoat resin component a) is 1:10 to 1:100.

9. The coating composition of claim 1 comprising a mixture of mono- and di-perfluoropolyether silanes.

10. The coating composition of claim 1 wherein the silsesquioxane hardcoat resin component is a co-condensate of 1 to 20 wt. % silica nanoparticles and 80-99 wt. % silsesquioxane.

11. A method for coating a substrate comprising the steps of:
    1. providing a substrate,
    2. contacting the stainless steel substrate with the coating composition of claims 1, and
    3. curing.

12. The method of claim 11 wherein said step of contacting comprises solution coating.

13. The method of claim 11 wherein said step of curing comprises heating.

14. The method of claim 11 wherein said step of contacting provides a coating of said coating composition of less than 200 Angstroms thickness.

15. The method of claim 11 wherein the substrate comprises ceramics, glazed ceramics, glass, metals, natural and man-made stone, and thermoplastic materials.

16. The method of claim 11 wherein the substrate comprises stainless steel.

17. The method of claim 11 wherein said step of contacting provides a coating of said coating composition of greater than 15 Angstroms thick.

* * * * *

UNITED STATES PATENT AND TRADEMARK OFFICE
CERTIFICATE OF CORRECTION

PATENT NO. : 8,268,067 B2  
APPLICATION NO. : 12/574182  
DATED : September 18, 2012  
INVENTOR(S) : Suresh Subramaniya Iyer Page 1 of 1

It is certified that error appears in the above-identified patent and that said Letters Patent is hereby corrected as shown below:

Column 1  
Line 44, delete "$R_1$" and insert -- $R^1$ --, therefor.  
Line 49, delete "$R_2$" and insert -- $R^2$ --, therefor.

Column 4  
Line 31, after "X" insert -- , --.

Column 6  
Line 14, delete "$(C_nH_2)$" and insert -- $(C_nH_{2n})$ --, therefor.

Column 8  
Line 17, delete "SHC-12™" and insert -- SHC-1200™ --, therefor.

Column 14  
Line 6, after "rankings" insert -- . --.  
Line 32, delete "linking" and insert -- linking. --, therefor.

Column 17  
Line 39, in Claim 5, delete "$R^{10}$is" and insert -- $R^{10}$ is --, therefor.

Column 18  
Line 3, in Claim 6, delete "$R^{10}$is" and insert -- $R^{10}$ is --, therefor.  
Line 21, in Claim 11, delete "claims" and insert -- claim --, therefor.

Signed and Sealed this  
Fifteenth Day of January, 2013

David J. Kappos  
*Director of the United States Patent and Trademark Office*